INVENTOR.
MICHAEL STEFANYK

INVENTOR.
MICHAEL STEFANYK

March 11, 1969 M. STEFANYK 3,431,872
MUNICIPAL INCINERATOR
Filed May 8, 1967 Sheet 3 of 7

INVENTOR.
MICHAEL STEFANYK

INVENTOR.
MICHAEL STEFANYK

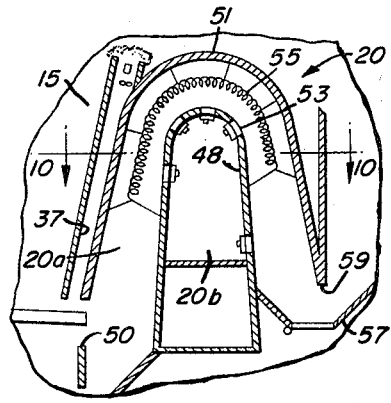
Fig. 9
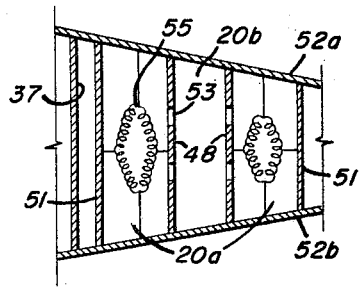
Fig. 10
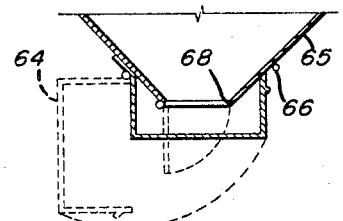
Fig. 11
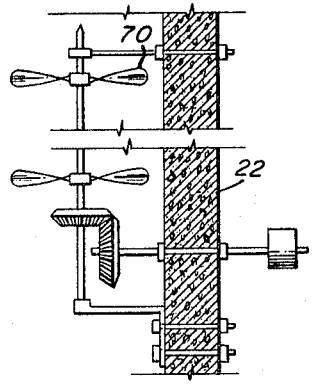
Fig. 12
Fig. 13
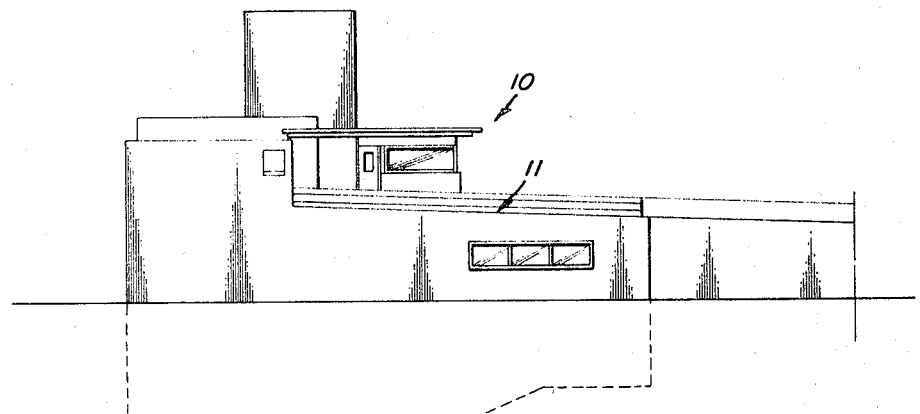
Fig. 17
INVENTOR.
MICHAEL STEFANYK

INVENTOR.
MICHAEL STEFANYK

INVENTOR.
MICHAEL STEFANYK

United States Patent Office 3,431,872
Patented Mar. 11, 1969

3,431,872
MUNICIPAL INCINERATOR
Michael Stefanyk, Hinckley, Ohio
(4406 Forest Hills Blvd., Parma, Ohio 44134)
Filed May 8, 1967, Ser. No. 636,848
U.S. Cl. 110—7     25 Claims
Int. Cl. F23b 7/00; F23k 5/00; F23h 15/00

ABSTRACT OF THE DISCLOSURE

A municipal incinerator embodying a furnace including a combustion chamber having an opening to receive refuse dumped from a truck. The chamber includes a hearth for supporting the refuse having a set of stationary grate bars, a set of movable grate bars, and a plurality of air conduits disposed intermediate the aforementioned bars to distribute the refuse through the hearth. Second and third chambers for secondary combustion and cleansing the products of combustion are provided. A fan induces the flow of gases through the chambers. Plural furnaces may be provided to burn refuse in one furnace while filling the other furnace.

Background of the invention

The invention pertains to a furnace suitable for a municipal installation for ready burning of refuse which is collected by a municipality and is delivered by truck to the incinerator.

Prior art structures for burning large quantities of refuse have required overhead cranes to transfer the refuse from a storage bin at the incinerator and for transferring it to the furnace progressively as the furnace is able to consume its contents. Such incinerators have required an objectionable number of persons for maintaining it in operation. A further objection has been the difficulty of complying with the stringent air pollution regulations resulting from the temporary storage of the refuse.

Summary of the invention

According to the present invention the refuse is brought to the incinerator building in trucks which are emptied into either one of two chambers the doors to which are accessible from the floor on which the truck is driven into the building. One such receiving chamber is adapted to be closed and utilized for the burning of refuse while the other is being charged with fresh material. At the completion of the burning operation the empty chamber will then be charged whereas the material in the charged chamber will then be subjected to a burning operation. The material in each receiving chamber forms a bed upon a hearth through which a source of fuel ignites the material and through which a source of primary air is forced under pressure. The products of combustion progressively move into a second chamber wherein the temperature of the gases is raised and wherein secondary air for supporting combustion is introduced. From the second chamber the gases flow through a washer from whence they flow into a stack. One set of chambers is positioned adjacent the other set whereby a common stack may be utilized for discharge of gases from both units.

An incinerator embodying the present invention will comply with the most stringent air pollution regulations and will possess no initial operating and maintenance costs. It can be constructed to burn large quantities of refuse as for example over 500 cubic yards in one loading. The entire operation may be performed with one or two men instead of five to eight men per shift. Refuse storage is eliminated and the size of the building would be decreased about one-third of the conventional size of incinerators presently in use. The invention also eliminates the need for a high chimney due to the fact that smoke and gases are burned in the second chamber and then washed in a set collector whereby ash and solid particles are substantially entirely removed.

A further advantage of the present invention is the fact that the refuse may be loaded directly into the furnace and burned in a few hours instead of feeding the furnace small amounts by crane or by hand. The ash is burned to a minimum amount aggregating less than 5% instead of approximately 50% in conventional incinerators and may be dumped from the ash hopper door directly into a truck.

Brief description of the drawings

In the drawings,

FIG. 9 is a vertical section through a portion of the secondary combustion chamber on a scale larger than that shown in FIG. 1;

FIG. 10 is a horizontal section taken through the secondary combustion chamber on a plane indicated by the line 10—10 in FIG. 9;

FIG. 11 is a vertical section on a large scale through the hopper of the wet collector;

FIG. 12 is a vertical section through a portion of the stack illustrating a fan for inducing the flow of gases up the stack;

FIG. 13 is a front view of an air regulating device for regulating the volume of secondary air;

FIG. 17 is a side elevation of a building suitable for housing the incinerator of the present invention.

Description of the preferred embodiments

Figures 1, 2:
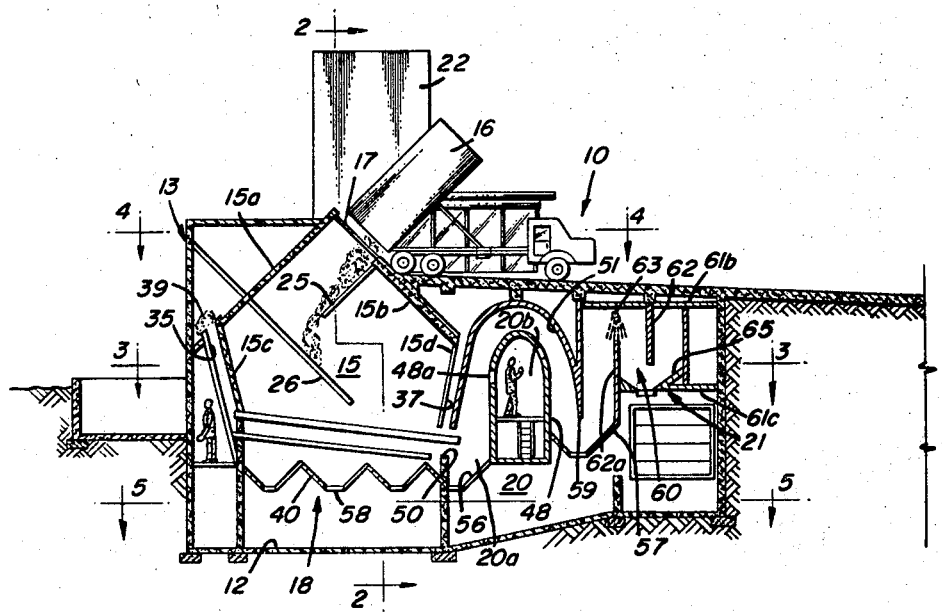
FIG. 1 is a vertical section taken through an incinerator embodying the present invention and taken on a plane indicated by the line 1—1 in FIG. 4.
FIG. 2 is a vertical transverse section taken on the plane indicated by the line 2—2 of FIG. 1.

The present invention embodies a furnace and system of handling refuse by means of which the refuse can be quickly burned as it is brought to the incinerator in trucks. The system enables the burning to be accomplished with a minimum amount of ash and provides for the removal of the ash or sludge by means of trucks which can be loaded directly from the ash hoppers 40 or sludge hoppers 65. Thus a building 10 indicated in general at FIG. 17 has an unloading area or floor 11 onto which trucks may be driven bringing refuse to the incinerator. The building has a lowermost floor 12 (FIG. 2) upon which trucks may be driven for removing the contents of the ash and sludge hoppers and transporting them directly from the building. Intermediate the floors 11 and 12 are furnaces designated generally at 13. The furnaces are preferably of identical construction so that the following description will proceed with reference to one thereof. Though two furnaces have been shown, it is to be understood that any number may be employed, as desired.

As shown, each furnace includes a first chamber 15 which constitutes a receiving chamber into which the refuse may be dumped from a truck 16 through an opening 17. The bottom of each chamber 15 comprises a hearth, indicated in general at 18, upon which the bed of refuse is supported. The primary or receiving chamber 15 is in communication adjacent one end of the hearth with a secondary chamber, indicated in general at 20, in which the products of combustion are heated and then conveyed to a third or washing chamber, indicated in general at 21, from whence the gases flow into a stack 22.

As shown, the receiving chamber 15 is preferably of a polygonal construction, such as pentagonal, defined by a pair of upper inclined top walls 15a and 15b, and a pair of downwardly extending side walls 15c and 15d. The top wall 15b includes the opening 17 which is adapted to be opened and closed by a door 17a. By this arrangement, the access opening 17 with the chamber 15 is disposed so as to readily receive refuse delivered by a truck 16, as seen in FIG. 1. The material discharged into the chamber 15 is guided therethrough by two sets of angularly disposed baffle bars 25 and 26. As best seen in FIGS. 1 and 2, the bars 25 are spaced laterally apart from one another and are preferably disposed in a common plane which extends substantially at right angles with respect to the top wall 15b and generally parallel to the other top wall 15a. The bars 25, in the form shown, terminate short of the other set of bars 26 to provide a grate therebetween as well as a passageway around the ends thereof. The bars 26 are also laterally spaced and preferably lie in a common plane which extends at right angles from the top wall 15a and generally parallel to the top wall 15b. The bars 26 also extend beyond the extension of the bars 25. The bars 26, in effect, provide impaction surfaces for the refuse material impinged thereon from the bars 25. This serves to spread the refuse material and to break the fall thereof as it decends into the hearth 18. Preferably, the bars 25 and 26 are cylindrical in shape having a diameter of about 2 inches and with a spacing therebetween of about 2 feet, as desired.

Figure 6:
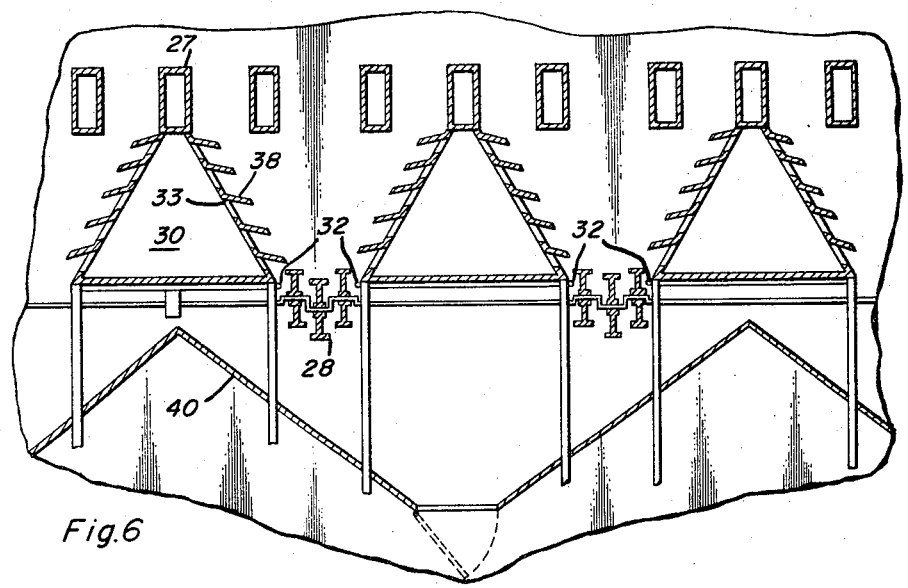
FIG. 6 is a vertical section partly in elevation taken through the hearth and grate of a receiving chamber and on a scale larger than that shown in FIG. 1.
Figure 5:
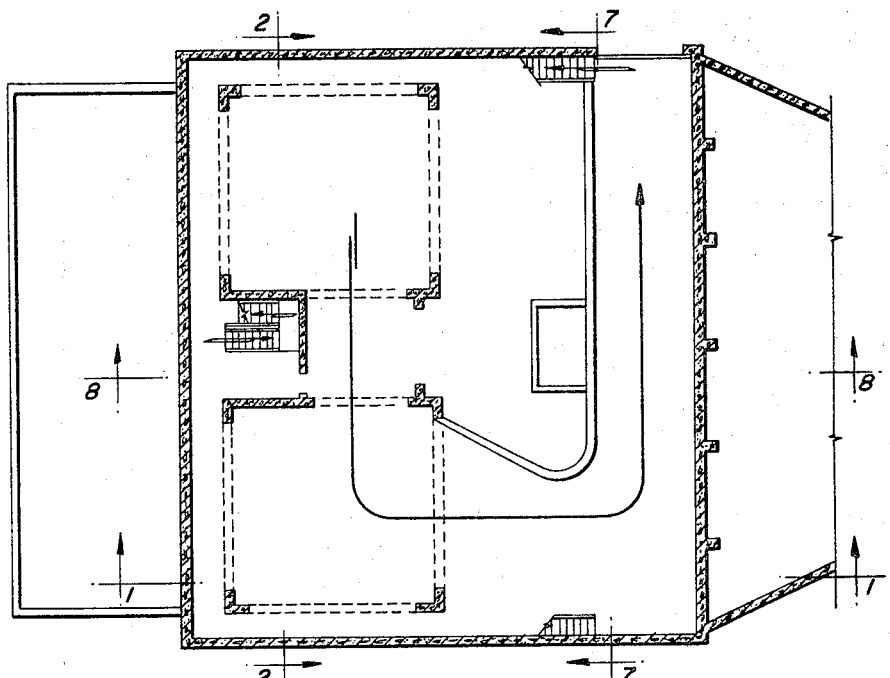
FIG. 5 is a horizontal section taken on the plane indicated by the line 5—5 in FIG. 1.

The hearth 18 at the bottom of each receiving chamber 15 preferably comprises an upper set of stationary grate bars 27. (FIG. 6), a series of lower movable grate bars indicated in general at 28 and a plurality of intermediately disposed stationary conduits indicated in general at 30. The grate bars 27 may be solid, but are preferably hollow so as to allow the passage of air therethrough.

The conduits 30 are of an elongated, hollow construction which may extend substantially the full length of the chamber 15, as shown in FIG. 1, between the side walls 15c and 15d. The conduits 30 are spaced laterally apart and are preferably of a polygonal cross-section, such as triangular, defined by inclined side walls 33 and a bottom wall 34. The side walls 33 each have a series of vertically spaced, elongated openings 31, such as slots, disposed along the full length thereof which enable air to pass outwardly from the interior of the conduits 30 and upwardly through the refuse material disposed between adjacent of the conduits 30 and upwardly past the grate bars 27.

At the start of the operation some of the material will pass between the grate bars 27 and be disposed in supported relation upon the movable grate bars 28. Suitable ignition means is provided to ignite the refuse. Preferably, the burning is initiated by a gas flame which is introduced into the material through gas conduits 32 (FIG. 6) which extend lengthwise of the conduits 30 and adjacent the bottom wall 34 thereof. Any number of gas conduits 32 may be provided, but preferably one conduit is provided adjacent each side of the conduit 30, and is sufficient to enable combustion to be maintained. Preferably, the gas flame is ignited for a length of time sufficient to ignite the refuse. Thereafter, the heat of the burning refuse coupled with the air supply will maintain combustion. By the foregoing procedure, the complete contents of the primary combustion chamber may be incinerated in a period of approximately two hours.

Figure 14:
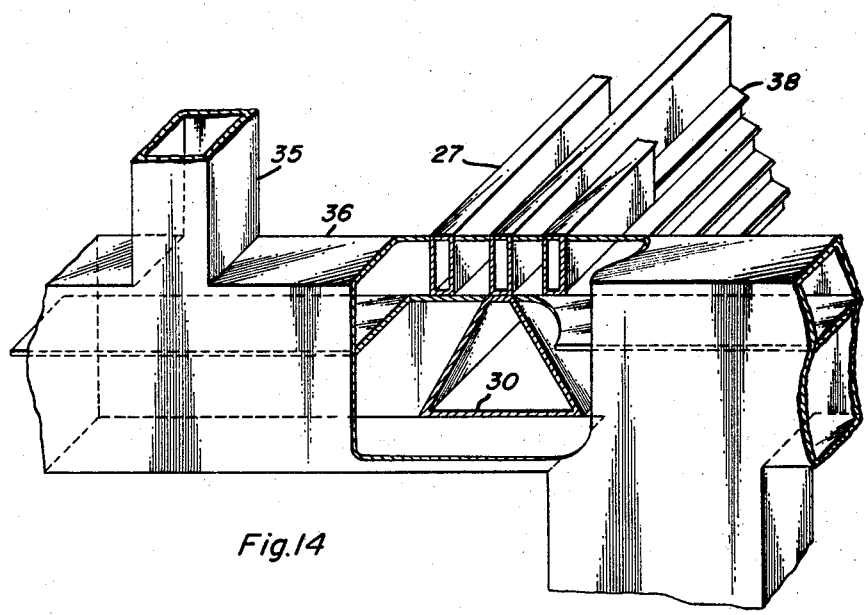
FIG. 14 is a fragmentary perspective view on an enlarged scale, showing a portion of the air intake manifold for the primary air.
Figure 15:
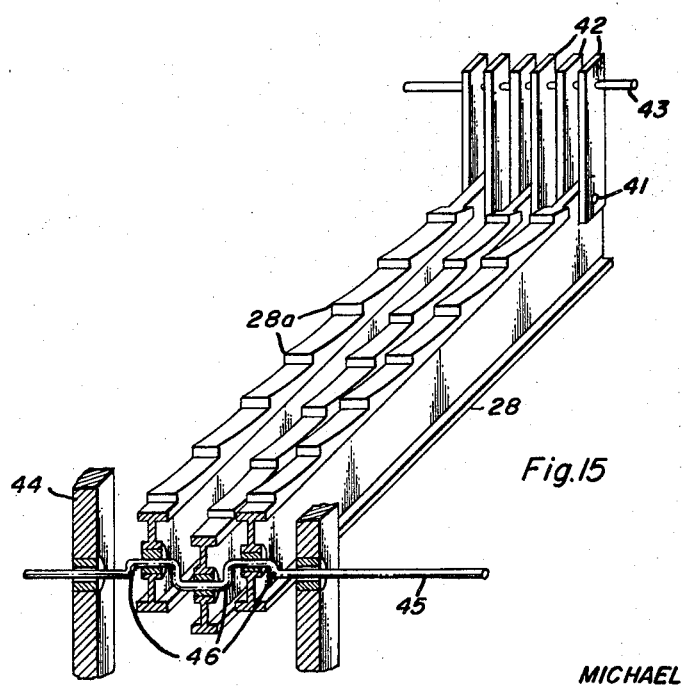
FIG. 15 is a fragmentary perspective view on an enlarged scale illustrating a form of movable grate which may be employed with the invention.
Figure 16:
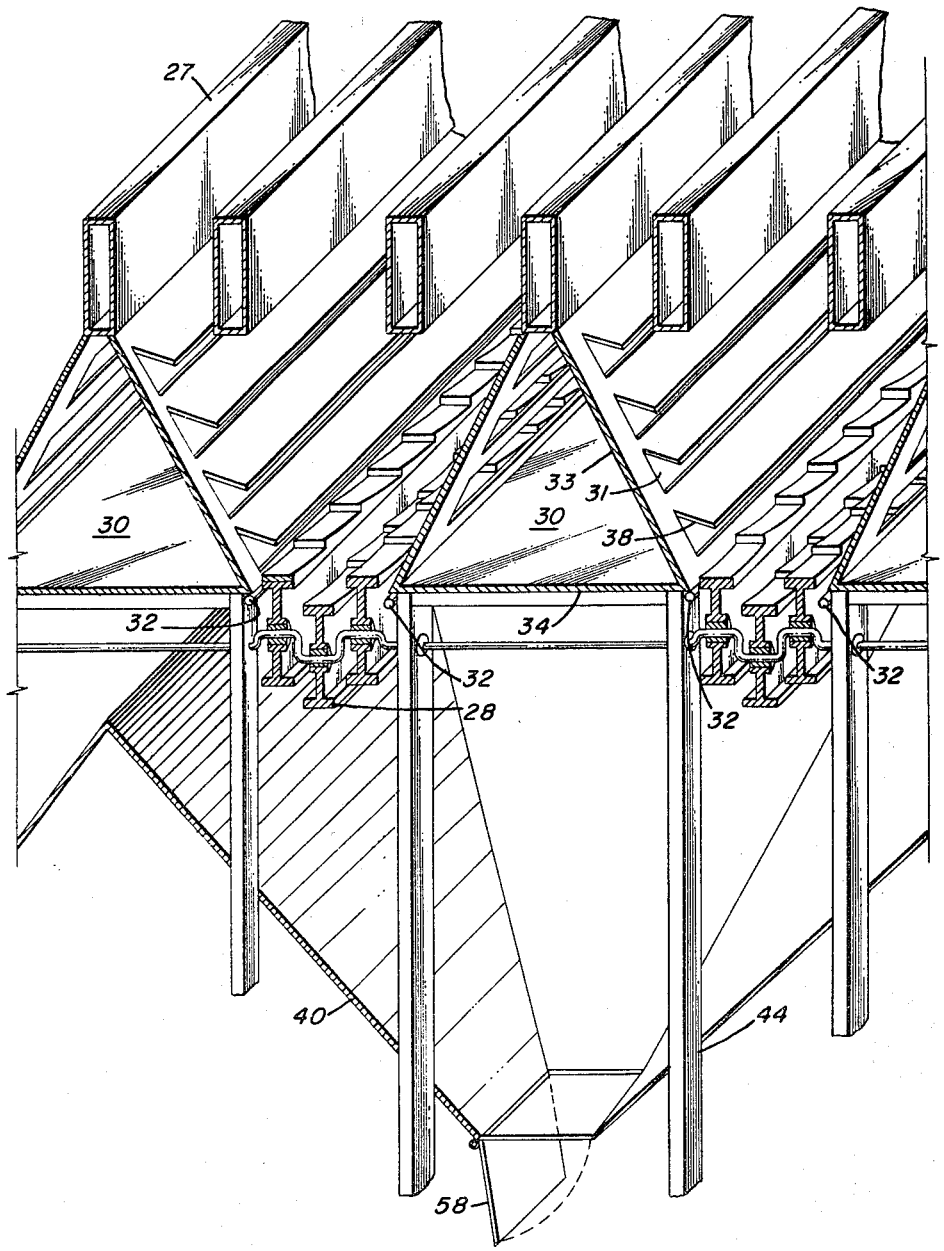
FIG. 16 is a perspective view illustrating the relationship between the grate and the hearth.

The structure of the hearth is shown in greater detail in FIGS. 14, 15 and 16, wherein air under pressure is introduced downwardly through a conduit 35 as by blower 39 (FIG. 1) and into a manifold 36 from whence it flows into the respective conduits 30 and also the hollow grate bars 27. Air entering the conduits 30 passes laterally outwardly through openings 31, then upwardly through the bed of refuse and between the grate bars 27. Air flowing through the grate bars 27 passes into a chamber 20 and is used for supporting secondary combustion. Such air is thus preheated as it passes through the grate bars 27. The air flowing into the bed of refuse through the openings 31 is utilized for supporting primary combustion. Additional air for supporting secondary combustion may be introduced into the products of combustion flowing from the chamber 15 into the chamber 20 through conduit 37 which is positioned within the chamber 15 in contiguous relationship to a wall of the chamber 20, whereby the air is preheated before entering the chamber 20.

Each conduit 30 may have laterally extending baffle plates 38 which extend lengthwise outwardly of the conduits, the plates assist in supporting the refuse and in maintaining the openings 31 sufficiently clear for the flow of air into the bed of material.

The movable grate bars 28 are positioned between the conduits 30 and adjacent the bottom wall 34 thereof and may extend the full length thereof. Any suitable means for actuating the bars 28 can be utilized so as to produce a slight movement and thereby dislodge the ash to allow it to drop into any of a series of ash hoppers 40 (FIG. 16) which extend across the chamber 15 beneath the hearth. The contents of the hoppers may be removed therefrom by opening the closure members 58, which may be pivotally connected adjacent the bottom of the hoppers. As shown in FIGS. 14 and 15, one end of each grate bar 28 may be pivotally connected to a pin 41, each of which may be pivotally connected to a pair of links 42 which in turn may be pivotally connected at their upper ends to a rod 43 which is supported in the framework indicated in general at 44 (FIGS. 15 and 16). This arrangement permits this end of the bars to swing freely as desired. The end of the bars 28 opposite the links 42 may be connected to crank arm 45 which is journaled within the framework 44 and is adapted to be driven by any suitable source of power means, such as an electric motor (not shown).

The crank arm 45 includes between its ends a series, such as three, generally U-shaped cam-like crank elements 46 adapted for camming coacting engagement with a respective one of the grate bars 28, upon actuation of said crank arm 45. By this arrangement, two alternate grate bars 28 may be moved, such as upwardly and downwardly or longitudinal in the same direction but opposite the movement of an intermediate grate bar to provide an effective grating action on the refuse supported thereon. It is to be understood, however, that any number and/or arrangement of grate bars and/or crank arms may be employed, as desired.

The movable grate bars 28, which may have any suitable cross-section configuration, are shown in FIG. 15 as being generally I-shaped. Preferably, the top surface of the bars 28 may include a plurality of projections 28a, such as saw-tooth type projections, which upon movement of the bars will act to mix the refuse thereby providing more complete burning in addition to breaking loose the ashes which have been compacted thereabove.

As the refuse is burned in chamber 15 certain products of combustion, such as gases, small solid material and the like, will be forced or drawn through a plurality of openings such as opening 50 from the chamber 15 into the secondary combustion chamber 20 (FIG. 1). The secondary combustion chamber 20 is preferably U-shaped defined by a generally arched upper outer wall member 51 (FIG. 9) when viewed in side elevation, which is disposed between two generally vertical side walls 52a and 52b that taper toward one another in a direction away from the hearth 18. A second lower inner wall 48 is disposed in the chamber spaced apart from the upper outer wall 51, having the same general shape as the outer wall 51, thereby forming a U-shaped combustion compartment 20a for the products of combustion to follow in passing through the secondary combustion chamber 20. Positioned in the U-shaped compartment 20a in the path of the flowing gases are heating elements 55, preferably electrical, which may raise the temperature of the gases to about 2000° F. thereby assuring complete combustion of the materials passing therethrough.

The second lower inner wall 48 forms the outer wall of central compartment 20b which is adapted to provide a source of secondary ambient air for the combustion compartment 20a as required.

Located in wall 48 are openings 48a which allow the ambient air to pass from the compartment 20b into the compartment 20a. A suitable ventilation device 53, such as the device shown in FIG. 13 may be positioned in the opening 48a to vary the size at the opening and control the quantity of ambient air passing into compartment 20a from compartment 20b.

Figure 3:
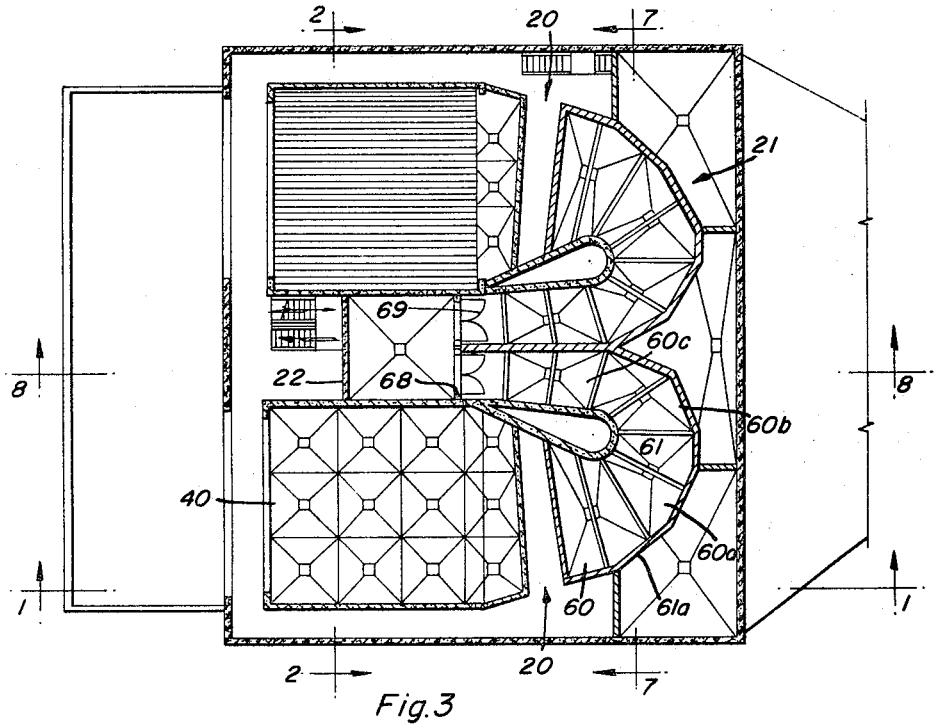
FIG. 3 is a horizontal section taken on the plane indicated by the line 3—3 in FIG. 2.
Figure 4:
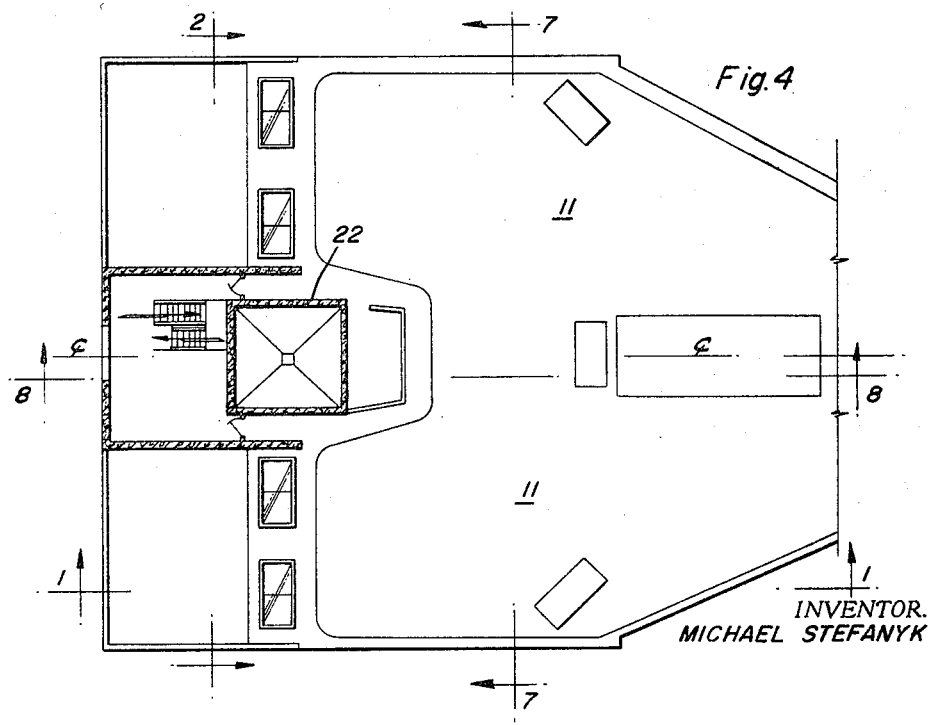
FIG. 4 is a horizontal section taken on the plane indicated by the line 4—4 in FIG. 1.

As best seen in FIGS. 1 and 3, the washing chamber 21 is disposed adjacent the combustion chamber 20 and in fluid communication therewith via the opening 59. A washing chamber is associated with each of the furnaces and communicates with the common outlet stack 22, as will hereinafter be more fully described.

As shown, each washing chamber 21 is of a generally J-shaped construction, in top plan FIG. 3, including a series of communicating washer compartments 60, 60a, 60b and 60c defined by curved side walls 61 and 61a of which the distance therebetween progressively narrows in a direction toward the common stack 22. The chamber 21 also includes upper 61b and lower 61c walls which define the top and bottom portions of the respective compartments. As best shown in FIG. 1, a hopper 65 is disposed between the top and bottom walls 61b and 61c with a baffle wall 62 extending downwardly from the top wall 61b and into the hopper 65. Another baffle wall 62a which forms a part of the hopper 57 extends upwardly into the compartment and in spaced, generally parallel relation to the baffle wall 62. A fluid discharge means 63, such as a spray member, is disposed in the compartment above the baffle wall 62a for discharging a curtain of liquid, such as water, downwardly through the compartment. By this arrangement, air to be cleaned is directed in a tortuous path first upwardly over the baffle wall 62b and then downwardly and upwardly around the baffle wall 62 wherein it is simultaneously wetted by the liquid discharge from the spray member 63. Hence, the air to be cleaned enters the washing chamber 21 via opening 59 and is directed through this tortuous path, whereafter, it leaves the last compartment of the chamber at an angle such as 180°, for discharge into the stack 22.

In the embodiment shown, the hopper 65 in each compartment, such as 60, is provided with a moisture collector 64 of a generally U-shaped construction which is pivotally connected, as at 64a, to the bottom of the hopper, as seen in FIG. 11. A suitable locking device 66, such as a latch, may be provided for holding the collector in closed position with respect to the discharge end of the hopper 65. By this arrangement, any moisture passing into the respective hopper from the spray members 63 which may leak past the hopper closure plate 68 will be picked up and trapped in the collector 64 so as to prevent any moisture and/or sludge from spilling over onto the work floor.

Figure 7:
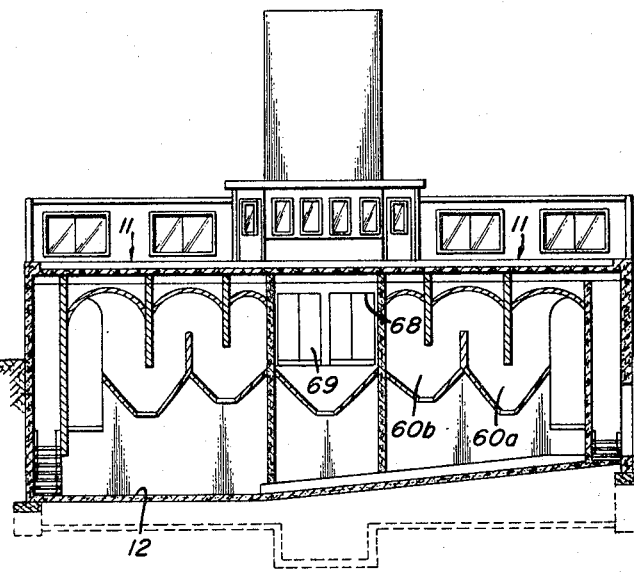
FIG. 7 is a section taken on a plane indicated by the line 7—7 in FIG. 3.
Figure 8:
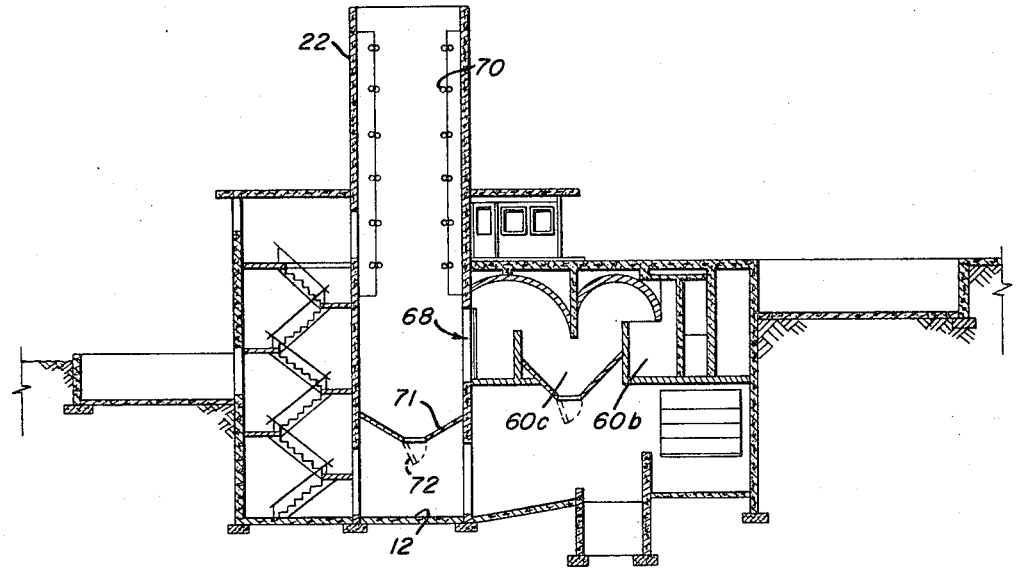
FIG. 8 is a vertical section taken on a plane indicated by the line 8—8 in FIG. 3.

As best seen in FIGS. 2, 7 and 8, the stack 22 is disposed between and extends upwardly between an adjacent pair of furnaces so as to provide a common discharge for the cleaned gaseous products of combustion delivered from the respective washing chambers 21. An air flow control means, such as a damper 69, may be disposed in an opening 68 in the stack 22 through which the cleaned air is delivered from the last washing chamber 60c. The stack may be provided with a series of spaced rows of propulsion means 70, such as fans 70, as best seen in FIG. 12, for forcing the gases upwardly and out of the stack 22. A hopper 71 is disposed in the stack adjacent the bottom thereof and also includes a movable closure plate 72 (FIG. 8) to enable the removal of any materials which do not pass out of the stack.

In accordance with the invention, a dual furnace arrangement is provided with a common stack for use in a municipal incinerator wherein refuse materials may be quickly and efficiently burned. The invention provides a substantialy continuous system, wherein one furnace is burning refuse while another furnace is being loaded with refuse materials to be burned. The refuse materials are delivered and disposed at one level, solid materials of combustion, such as ash, are removed at another level, and the gaseous products of combustion are effectively cleansed for discharge without contamination of the atmosphere.

In accordance with the invention, though the grate bars 27 have been illustrated as being generally parallel to one another, it is to be understood that the bars may also be arranged in other relationships or patterns, such as in domed, arched, pyramidal or other similar shapes, so as to provide a tunnel-like burning area for the refuse material. Similarly, the conduits 30 may be of other cross-sectional shapes other than polygonal, such as circular or the like.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:
1. A municipal incinerator plant for use in treating refuse materials or the like comprising,
   a dumping area,
   at least one furnace means, said furance means including a first chamber disposed below said dumping area for receiving refuse material therein,
   hearth means disposed adjacent the bottom of said receiving chamber and adapted to provide a support-like bed for said refuse material,
   ignition means disposed adjacent said hearth means for igniting said refuse material,
   means for forcing air under pressure through said hearth means and into the supported bed of refuse material to provide primary combustion therein,
   a second chamber disposed in communication with said first chamber adjacent said hearth means and adapted to receive products of combustion upon burning of said refuse material,
   said second chamber having aperture means for admitting air to provide secondary combustion therein,
   heating means for heating the products of combustion in said second chamber,
   a third chamber disposed in communication with said second chamber and adapted to receive the products of combustion from said second chamber,
   spray means disposed in said third chamber through which the heated products of combustion are adapted to pass, outlet stack means disposed in communication with said third chamber for discharge of gaseous products of combustion from said third chamber, hopper means disposed beneath said hearth means and said second and third chambers adapted for removal of solid products of combustion therefrom, said hearth means including a first set of grate bars, said grate bars being laterally spaced from one another and extending generally parallel throughout their length, a plurality of sets of inclined plates, a second set of grate bars disposed adjacent the lower ends of said inclined plates, and said inclined plates being disposed beneath said first set of grate bars for directing the refuse toward said second set of grate bars.

2. An incinerator plant in accordance with claim 1 including a pair of furnace means disposed in side-by-side relationship and beneath said dumping area, and the third chamber of each of said furnace means communicating individually with said outlet stack means.

3. An incinerator plant in accordance with claim 1, including a removal area disposed beneath said hopper means to enable removal of solid products of combustion, by truck, discharged from said hopper means.

4. An incinerator plant in accordance with claim 1, wherein said ignition means is disposed adjacent the lower ends of said inclined plates.

5. An incinerator plant in accordance with claim 1, wherein said first set of grate bars is inclined downwardly in a direction toward and terminating adjacent said second chamber.

6. An incinerator plant in accordance with claim 1, wherein said first set of grate bars are of an elongated, hollow construction adapted to receive and pass therethrough a fluid cooling medium and provide air for combustion in said second chamber.

7. An incinerator plant in accordance with claim 1, wherein said second set of grate bars is movable, one end of said grate bars being operably connected to an actuation means, and the other end of said grate bars being movably connected to said hearth means for agitation upon actuation of said actuation means.

8. An incinerator plant in accordance with claim 1, wherein said inclined plates define a passageway therethrough, said plates having a plurality of openings therein communicating with said passageway, and a plurality of baffle means mounted on the exterior of said plates adjacent said openings.

9. An incinerator plant in accordance with claim 1, wherein said third chamber includes a series of communicating compartments, said spray means disposed in each of said compartments and adapted for spraying a liquid material into said compartments, each of said compartments including a downwardly extending baffle member and an upwardly extending baffle member disposed in offset relationship with respect to said first mentioned baffle member adapted to direct the products of combustion in a tortuous path through said chamber, a hopper disposed in each of said compartments, and said compartments each progressively narrowing in width in a direction from said second chamber toward said outlet stack means.

10. An incinerator plant in accordance with claim 9, including a collector means operably connected to each of said hoppers adapted to collect moisture received in each of said hoppers.

11. A hearth for use with an incinerator comprising, a set of relatively stationary grate bars, a set of relatively movable grate bars disposed below said first mentioned set of grate bars, a plurality of conduit members disposed below said first mentioned set of grate bars, and laterally adjacent said second mentioned set of grate bars, and ignition means disposed adjacent said conduit members and said second mentioned set of grate bars.

12. A hearth in accordance with claim 11, wherein each of said movable grate bars includes a plurality of longitudinally spaced tooth means projecting upwardly therefrom.

13. A hearth in accordance with claim 11, wherein said relatively stationary grate bars are of elongated, hollow construction adapted to receive and transmit a fluid cooling media therethrough.

14. A hearth in accordance with claim 11, wherein each of said conduit members includes a bottom wall and a pair of inclined side walls extending upwardly from said bottom wall, said side walls having a plurality of openings extending therethrough, and a plurality of baffle members extending outwardly from said walls adjacent the respective openings therein.

15. A hearth in accordance with claim 14, wherein said ignition means is disposed adjacent the lower end of said inclined side walls and adjacent said bottom wall for igniting the refuse material in the area above said movable grate bars and intermediate said inclined side walls.

16. A hearth in accordance with claim 11, including a frame, an actuation means, one end of said movable grate bars being operably connected to said actuation means, and the other end of said movable grate bars being movably connected to said frame for movable agitation in response to actuation of said actuation means.

17. A hearth in accordance with claim 16, including a cam-like means operably connected adjacent the ends of said movable grate bars and to said actuation means to cause alternate agitating movement of said grate bars relative to one another in response to actuation of said actuating means.

18. A municipal incinerator plant for use in treating refuse materials or the like comprising, at least one furnace means, said furnace means including a receiving chamber adapted to receive refuse material therein, hearth means disposed adjacent the bottom of said receiving chamber and adapted to provide a support-like bed for said refuse material, ignition means disposed adjacent hearth means for igniting said refuse material, a first set of laterally spaced grate bars disposed in said furnace means and extending generally parallel to one another throughout their length, a second set of grate bars disposed below said first set of grate bars, a plurality of conduit members disposed below said first set of grate bars and laterally adjacent said second set of grate bars for directing refuse passing through said first set of grate bars onto said second set of grate bars, and outlet stack means disposed in communication with said furnace for discharge of gaseous products of combustion from said furnace.

19. An incinerator plant in accordance with claim 18, wherein said conduit members include sets of inclined plates diverging away from one another in a direction away from said first set of grate bars, said ignition means is disposed adjacent said conduit members and said second mentioned set of grate bars,
said conduit members include a bottom wall,
said bottom wall and said inclined plates defining a passageway therethrough,
said plates having a plurality of openings therein communicating the interior of said conduits with the exterior of said hearth, and
wherein said conduits include a plurality of baffle means mounted on the exterior of said plates adjacent said openings.

20. An incinerator plant in accordance with claim 18, wherein
said second set of grate bars is disposed adjacent the lower ends of said inclined plates,
said second set of grate bars is movable, and
one end of said grate bars being operably connected to an actuation means and the other end of said grate bars being movably connected to said hearth means for agitation upon actuation of said actuation means.

21. An incinerator plant in accordance with claim 19, wherein
said first set of grate bars is of an elongated, hollow construction adapted to receive and pass therethrough a fluid cooling medium, and
said first set of grate bars is inclined downwardly in the direction of flow of said products of combustion in said furnace.

22. An incinerator plant in accordance with claim 18, including
a second chamber disposed in communication with said receiving chamber adjacent said hearth means and adapted to receive products of combustion upon burning of said refuse material and the fluid medium from said first grate bars, and
said second chamber having aperture means for admitting air to provide secondary combustion therein.

23. An incinerator plant in accordance with claim 22, including
a third chamber disposed in communication with said second chamber and adapted to receive the product of combustion from said second chamber,
spray means disposed in said third chamber through which the heated products of combustion are adapted to pass,
said outlet stack means disposed in communication with said third chamber for discharge of gaseous products of combustion from said third chamber, and
hopper means disposed beneath said hearth means and said second and third chambers adapted for removal of solid products of combustion therefrom.

24. An incinerator plant in accordance with claim 18, including
means for forcing air under pressure through said conduit means and into the supported bed of refuse material to provide primary combustion in the space between said conduit members and lengthwise of said hearth and through said first set of grate bars for promoting secondary combustion in said second chamber.

25. An incinerator plant in accordance with claim 18, including
a pair of furnace means disposed in side-by-side relationship, and
each of said furnace means communicating individually with said outlet stack means.

References Cited

UNITED STATES PATENTS

| 658,658 | 9/1900 | Lester et al. | 110—17 |
| 954,855 | 4/1910 | Decarie | 110—17 X |
| 1,171,803 | 2/1916 | Reagan | 110—74 |
| 1,194,385 | 8/1916 | Hoover. | |
| 1,986,719 | 1/1935 | Evans | 110—8 |
| 1,996,585 | 4/1935 | McEver | 110—17 |

JAMES W. WESTHAVER, *Primary Examiner.*

U.S. Cl. X.R.

110—17, 33, 74